United States Patent [19]

Huong

[11] Patent Number: 5,190,391
[45] Date of Patent: Mar. 2, 1993

[54] VARIABLE TORSIONAL FORCE PIVOT SHAFT CONNECTOR

[75] Inventor: Chin-fu Huong, Taipei Hsien, China

[73] Assignee: Yen Yang Basestrong Co., Ltd., Taipei Hsien, Taiwan

[21] Appl. No.: 877,761

[22] Filed: May 4, 1992

[51] Int. Cl.⁵ .................................. F16C 11/00
[52] U.S. Cl. .............................. 403/96; 403/84
[58] Field of Search ............ 403/96, 146, 97, 84

[56] References Cited

U.S. PATENT DOCUMENTS

| | | | |
|---|---|---|---|
| 713,255 | 11/1902 | Traut | 403/146 |
| 3,322,388 | 5/1967 | Budreck | 403/96 X |
| 4,135,694 | 1/1979 | Stegenga et al. | 403/146 X |
| 5,022,778 | 6/1991 | Lu | 403/146 X |

FOREIGN PATENT DOCUMENTS 2186630  8/1987  United Kingdom ............... 403/146

*Primary Examiner*—Andrew V. Kundrat
*Attorney, Agent, or Firm*—Bacon & Thomas

[57] ABSTRACT

The display and keyboard halves of a notebook personal computer are pivotally connected together by a shaft and a base plate so that torsional force required to rotate the shaft is changed during pivoting of the halves by a corrugated spring plate having peaks and furrows which alternately engaged raised portions on the base plate.

5 Claims, 2 Drawing Sheets

VARIABLE TORSIONAL FORCE PIVOT SHAFT CONNECTOR

BACKGROUND OF THE INVENTION

The present invention relates to pivot shaft connectors, and more particularly, the present invention relates to a torsional force changeable pivot shaft connector used in connecting the two pivoted halves of a notebook computer together.

A variety of mobile personal computers, including lap top and notebook types, are known and widely in use. A notebook personal computer is generally comprised of two pivoted parts, namely, the display and the keyboard pivotably connected by pivot shaft connectors. The common disadvantage of the conventional pivot shaft connectors is that the torsional force is not changeable according to the position of the display relative to the keyboard. In actual practice, closing the display onto the keyboard requires less torsional force, while much torsional force is required in lifting the display from the keyboard. Because a constant torsional force is produced when opening or closing the display, the display may fall easily when lifted from the keyboard, or the display may be difficult to be lifted from the keyboard. The present invention has been accomplished to eliminate these problems. It is therefore the main object of the present invention to provide a pivot shaft connector which automatically varies changes the torsional force when the shaft is rotated on the base plate thereof.

DETAILED DESCRIPTION OF THE PREFERRED EMBODIMENT

Figure 1:
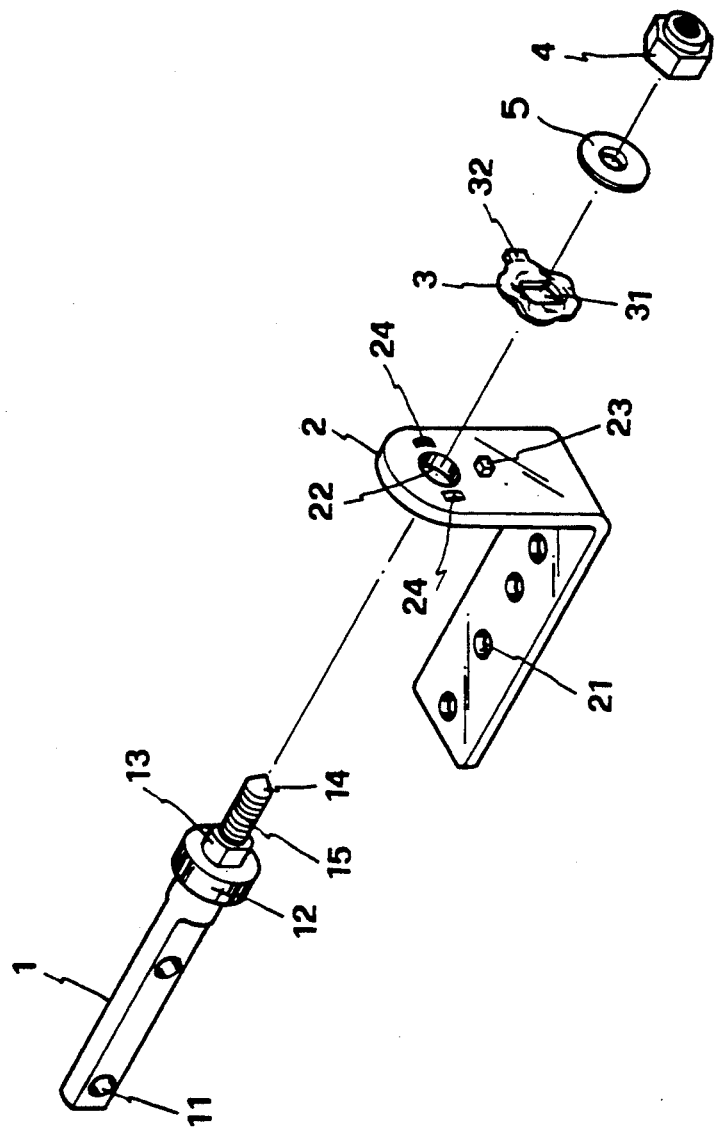
FIG. 1 is an exploded view of the preferred embodiment of the turning shaft connector of the present invention.

Referring to FIG. 1, the preferred embodiment of the pivotal shaft connector of the present invention is generally comprised of a shaft 1, a base plate 2, a corrugated spring plate 3, a nut 4 and a ring washer 5, wherein the shaft 1 has holes 11 spaced on the body thereof, through which screws are inserted to fasten the shaft 1 to one half part of a notebook computer, a front end formed into a front axle 14, which has an outer thread 15 around the peripheral outside surface thereof, a circular collar 12 near the front end thereof, which is to be stopped against the base plate 2, and a flange 13 between the circular collar 12 and the front axle 14. The base plate 2 is made from an angle plate having a plurality of holes 21 spaced on the transverse part thereof, through which screws are inserted to fasten the base plate to the other half part of the notebook computer, an axle hole 22 on the vertical part thereof, through which the front axle 14 and the flange 13 of the shaft 1 is inserted, a projecting strip 23 raised from the vertical part thereof below the axle hole 22 at an outer side, and two raised portions 24 bilaterally formed on the vertical part thereof at the outer side adjacent to the axle hole 22 above the projecting strip 23 to support the corrugated spring plate 3. The corrugated spring plate 3 is made from a high strength plate formed into a wavy configuration defined by alternating peaks and furrows, having a center hole 31 corresponding to the axle 13 for inserting the front axle 14 of the shaft 1, and a side projection 32 extended from the peripheral edge thereof; the nut 4 is to be fastened onto the outer thread 15 of the front axle 14.

During the assembly process, the front axle 13 is inserted through the axle hole 22 of the base plate 2, the center hole 31 of the corrugated spring plate 3, the ring washer 5 and fastened up with the nut 4, permitting the corrugated spring plate 3 to be mounted on the flange 13 of the shaft 1 and the collar 12 to be engaged against the vertical part of the base plate 2. Therefore, rotating the shaft 1 causes the spring plate 3 to be rotated relative to the base plate 2. After the shaft 1 and the base plate 2 have been respectively fastened to the two opposite turning parts of a notebook computer, the two opposite turning parts of the notebook computer can be pivoted on each other, and the range of pivoting, namely, the range of the rotary motion of the corrugated spring plate 3 is confined by the projecting strip 23 in stopping the side projection 32.

As indicated, the corrugated spring plate 3 has a corrugated outside surface, defined by peaks and furrows, engaged stopped against the raised portions 24 of the base plate 2. When rotated against the raised portions 24, the peaks and furrows of the outside surface of the corrugated spring plate 3 alternately passes through the raised portions 24 causing the torsional force to be continuously changed, and therefore, the shaft 1 and the connected half part of the notebook computer can be positioned at any of a variety of angles.

In an alternate form of the present invention, the two raised portions 24 may be removed from the base plate 2, permitting the corrugated spring plate 3 to be directly squeezed by the nut 4 against the flat outside surface of the base plate 2. In this alternate form, the shaft 1 can still be freely rotated on the base plate 2 and positioned at any of a variety of angles.

Figure 3:
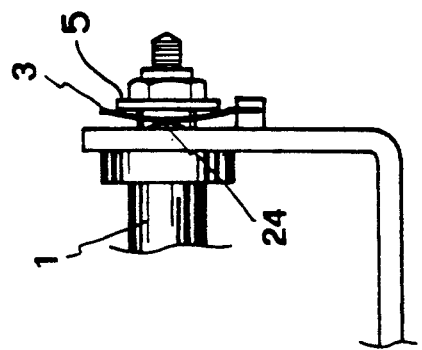
FIG. 3 is a partly sectional view thereof showing that the spring plate has been squeezed to deform by high torsional force.
Figure 2:
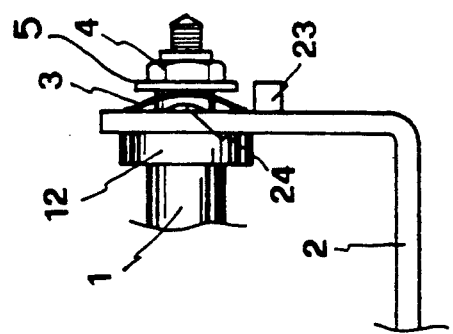
FIG. 2 is a partly sectional view thereof showing that the spring plate is squeezed by normal torsional force.

Referring to FIGS. 2 and 3, rotating the shaft 1 causes the spring plate 3 to create a variable torsional force. In FIG. 2, a furrow of corrugated spring plate 3 disposed adjacent portion 24 and creates a relatively small torsional force. In FIG. 3, a peak of corrugated spring plate 3 creates the highest torsional force by squeezing and deforming against the raised portion 24.

It shall be understood that the present invention is not limited to the embodiment shown by way of example and that various modifications can be made without departing from the basic teaching of the present invention. For example, the projecting strip 23 may be eliminated from the base plate 2, the shape of positions of the raised portions 24 may be changed, the front axle may be drilled and punched so that the corrugated spring plate 3 can be fastened thereto through a rivet joint without the use of the nut 4.

What is claimed is:

1. A pivot shaft connector for the two pivotal halves of a notebook personal computer comprising:
   a) a shaft for attachment to one half of the personal computer, the shaft including a front axle, a circular collar adjacent the front axle, and a rectangular flange disposed between the circular coolar and the front axle;

b) a base plate for attachment to the other half of the personal computer, the base plate including a plurality of raised portions, and an axle hole for receiving the front axle and the rectangular flange therethrough;

c) a spring plate having a corrugated configuration defined by alternating peaks and furrows, the spring plate including a rectangular hole for receiving the rectangular flange therethrough;

d) means carried by the front axle for securing the front axle to the base plate and disposing the spring plate against the base plate and adjacent the raised portions; and e) wherein when one half of the personal computer is pivoted relative to the other half, rotation of the front axle causes the peaks and furrows of the spring plate to alternately engage the raised portions of the base plate, thereby varying the torsional force required to rotate the shaft.

2. The pivot shaft of claim 1 wherein:

a) the base plate includes an outwardly extending projecting strip; and b) the spring plate includes a side projection extending outwardly from a peripheral edge thereof for engaging the projecting strip to limit the range of rotation of the shaft.

3. The pivot shaft of claim 1 further including a ring washer disposed between the spring plate and locking means.

4. The pivot shaft of claim 1 wherein the locking means includes an outer thread formed on the front axle and a threaded nut engageable with the outer thread.

5. The pivot shaft of claim 1 wherein the locking means includes a hole formed in the front axle and rivet fastened through the hole.

* * * * *